US010991536B2

(12) United States Patent
Okamoto et al.

(10) Patent No.: US 10,991,536 B2
(45) Date of Patent: Apr. 27, 2021

(54) ELECTRICAL CONNECTION BOX

(71) Applicant: Sumitomo Wiring Systems, Ltd., Mie (JP)

(72) Inventors: Noriko Okamoto, Mie (JP); Akihiro Oda, Mie (JP); Masakazu Okumura, Mie (JP); Tatsuya Daidoji, Mie (JP); Ryoma Hamada, Mie (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 16/693,512

(22) Filed: Nov. 25, 2019

(65) Prior Publication Data

US 2020/0185179 A1 Jun. 11, 2020

(30) Foreign Application Priority Data

Dec. 7, 2018 (JP) .............................. JP2018-230277

(51) Int. Cl.
*H01H 85/044* (2006.01)
*H01H 85/20* (2006.01)
*H01H 85/041* (2006.01)

(52) U.S. Cl.
CPC ...... *H01H 85/044* (2013.01); *H01H 85/0417* (2013.01); *H01H 85/205* (2013.01); *H01H 85/2045* (2013.01); *H01H 2085/208* (2013.01)

(58) Field of Classification Search
CPC ............. H01H 85/044; H01H 85/0417; H01H 85/2045; H01H 85/205; H01H 2085/208
USPC ....................................................... 337/189
See application file for complete search history.

(56) References Cited

U.S. PATENT DOCUMENTS

| | | | | |
|---|---|---|---|---|
| 5,546,267 A | * | 8/1996 | Frederiksen | ......... H01R 9/2441 361/119 |
| 5,624,277 A | * | 4/1997 | Ward | ................. H01R 13/7195 439/620.09 |
| 5,993,260 A | * | 11/1999 | Lindquist | ............... H01H 85/20 439/620.27 |
| 7,333,337 B2 | * | 2/2008 | Kita | .................... B60R 16/0239 165/104.33 |
| 7,927,111 B2 | * | 4/2011 | Kita | ....................... H05K 7/026 439/76.2 |
| 8,297,988 B2 | * | 10/2012 | Sugiura | .................. H01R 9/245 439/76.2 |
| 9,019,723 B2 | * | 4/2015 | Hattori | ................. H05K 5/0004 361/833 |

(Continued)

FOREIGN PATENT DOCUMENTS

JP       H9-283004 A    10/1997

*Primary Examiner* — Anatoly Vortman
(74) *Attorney, Agent, or Firm* — Honigman LLP

(57) ABSTRACT

Provided is an electrical connection box according to which it is possible to easily handle a substrate and a fuse module. An electrical connection box for a vehicle includes: an insertion housing into which a plurality of fuses are to be inserted; a plurality of fuse terminals each having one end portion inserted into a surface of the insertion housing, the fuse terminals connecting the fuses to a substrate; and a holding member that is arranged opposing the one surface of the insertion housing and holds the fuse terminals. The holding member includes a gripping portion provided on a side opposite to the insertion housing, and the gripping portion has a finger placement portion used for gripping.

12 Claims, 8 Drawing Sheets

(56) References Cited

U.S. PATENT DOCUMENTS

| | | | | |
|---|---|---|---|---|
| 2005/0013095 | A1* | 1/2005 | Oda | H05K 7/026 361/601 |
| 2006/0119463 | A1* | 6/2006 | Kubota | H01H 85/2045 337/182 |
| 2008/0149387 | A1* | 6/2008 | Oda | H05K 7/026 174/520 |
| 2009/0197477 | A1* | 8/2009 | Sugiura | H05K 7/026 439/721 |
| 2011/0180318 | A1* | 7/2011 | Yamada | H05K 5/0069 174/559 |
| 2013/0343018 | A1* | 12/2013 | Hattori | H05K 5/0026 361/755 |
| 2014/0127917 | A1* | 5/2014 | Makino | H01R 13/514 439/76.2 |
| 2014/0134886 | A1* | 5/2014 | Makino | H01R 12/724 439/629 |
| 2016/0156162 | A1* | 6/2016 | Yamaguchi | H05K 7/02 361/624 |

* cited by examiner

ELECTRICAL CONNECTION BOX

CROSS-REFERENCE TO RELATED APPLICATIONS

This application claims priority of Japanese Patent Application No. JP 2018-230277 filed on Dec. 7, 2018, the contents of which are incorporated herein.

TECHNICAL FIELD

The present disclosure relates to an electrical connection box to be used in a vehicle.

BACKGROUND

Conventionally, an electrical connection box into which fuses are inserted has been mounted in a vehicle.

JP H9-283004A discloses an electrical connection box including a box main body provided with: multiple fuse fitting portions into which fuses are to be fit; multiple fusible link fitting portions into which fusible links are to be fit; and a main fusible link fitting portion into which a main fusible link is to be fit, wherein the fuse fitting portions, the fusible link fitting portions, and the main fusible link fitting portion are sequentially arranged on one surface of the box main body.

JP H9-283004A is an example of related art.

The above-described electrical connection box is composed of a substrate on which electrical components and the like are mounted, a fuse module that is connected to the substrate, and into which fuses are inserted, and a case member containing the substrate and the fuse module.

On the other hand, in the process of manufacturing the electrical connection box, it can also be envisioned that in a state in which the case member has been assembled, that is, in a state in which the electrical components and the like of the substrate are exposed, handling such as gripping of the substrate and the fuse module is performed.

However, in such a case, a worker who assembles the electrical connection box needs to take care not to touch the terminals and the like of the electrical components when performing work, and thus there is a risk that the number of man-hours for work including handling will increase.

The present disclosure was achieved in view of these circumstances, and it is an object thereof to provide an electrical connection box that facilitates handling of a substrate and a fuse module.

SUMMARY

An electrical connection box according to one aspect of the present disclosure is an electrical connection box for a vehicle, including: an insertion housing into which a plurality of fuses are to be inserted; a plurality of fuse terminals for connecting the fuses in the insertion housing to a substrate; and a holding member that is arranged opposing a surface of the insertion housing and holds the fuse terminals. The holding member includes a gripping portion on a side opposite to the insertion housing, and the gripping portion has a finger placement portion used for gripping.

Advantageous Effects of Disclosure

According to an aspect of the present disclosure, it is possible to provide an electrical connection box according to which handling of the substrate and the fuse module can be performed easily.

DETAILED DESCRIPTION OF PREFERRED EMBODIMENTS

Figure 1:
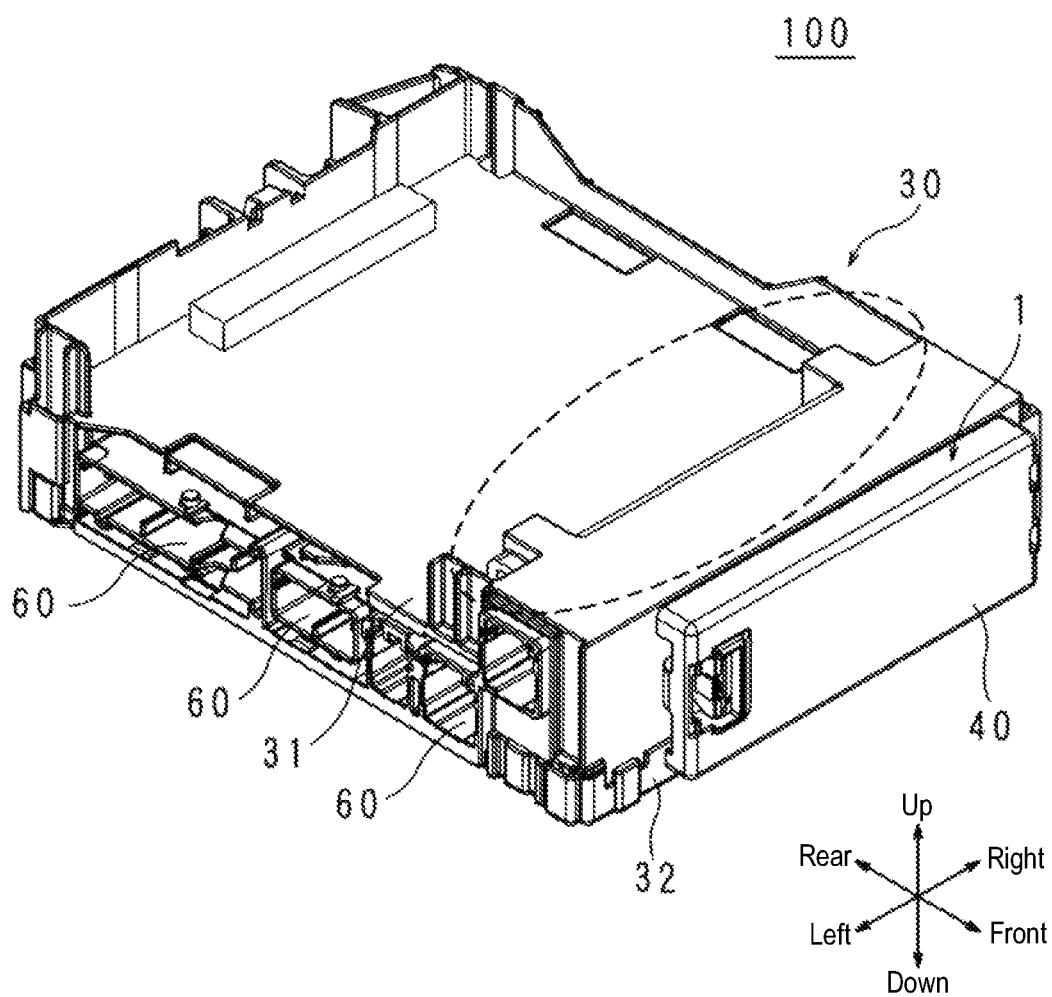
FIG. 1 is a perspective view showing an appearance of an electrical connection box according to the present embodiment.

First, embodiments of the present disclosure will be described in order. At least parts of the embodiments described hereinafter may be combined as needed.

An electrical connection box according to an aspect of the present disclosure is an electrical connection box for a vehicle, including: an insertion housing into which a plurality of fuses are to be inserted; a plurality of fuse terminals for connecting the fuses in the insertion housing to a substrate; and a holding member that is arranged opposing a surface of the insertion housing and holds the fuse terminals. The holding member includes a gripping portion on a side opposite to the insertion housing, and the gripping portion has a finger placement portion used for gripping.

In the present aspect, the holding member includes the gripping portion and the gripping portion includes the finger placement portion. Accordingly, a worker performing assembly work need only grip the gripping portion by placing a fingertip in the finger placement portion. Accordingly, during assembly work, it is possible to prevent other electronic components, terminals, and the like from deforming or being contaminated due to coming into contact with the worker's hand, and thus the work can be made easier.

In an electrical connection box according to an aspect of the present disclosure, the finger placement portion is a level difference provided in the gripping portion.

In the present aspect, the gripping portion has a level difference. Accordingly, a worker performing assembly work need only find the level difference and grip the gripping portion by placing a fingertip in the level difference. Accordingly, during assembly work, it is easy to recognize the gripping portion, the other electronic components, terminals, and the like can be prevented from deforming or being contaminated due to coming into contact with a worker's hand, and the work can be made easier.

In an electrical connection box according to an aspect of the present disclosure, the gripping portion is tube-shaped and is provided with a notch.

In the present aspect, notches are formed in the gripping portion. Accordingly, during assembly work, a worker need only grip the gripping portion by hooking his or her fingertips in the notches. Accordingly, the assembly work is easier.

In an electrical connection box according to an aspect of the present disclosure, the gripping portion is interposed between the fuse terminals, and the gripping portion protrudes past the fuse terminals in the direction in which the insertion housing and the holding member oppose each other.

In the present aspect, the gripping portion is interposed between the fuse terminals and protrudes past the fuse terminals. Accordingly, during assembly work, it is possible to suppress contact between a worker's hand and other electronic components, terminals, and the like, it is possible to prevent the other electronic components, terminals, and the like from deforming or being contaminated, and work can be made easier.

In an electrical connection box according to an aspect of the present disclosure, the substrate is provided parallel to a surface adjacent to the one surface of the insertion housing, the gripping portion extends in an intersection direction intersecting the substrate, the electrical connection box includes another terminal that is provided protruding in the intersection direction from the substrate and connects another type of fuse different from the fuses, and a dimension from the substrate to the level difference of the gripping portion in the intersection direction is greater than a dimension from the substrate to a leading end of the other terminal.

In the present aspect, the finger placement portion (level difference) of the gripping portion is provided farther away from the substrate than the other terminal in the intersection direction intersecting the substrate. Accordingly, during assembly work, it is possible to prevent the other terminal from deforming or being contaminated due to coming into contact with a worker's hand.

In an electrical connection box according to an aspect of the present disclosure, the plurality of fuse terminals are arranged side by side in one direction, and a plurality of the gripping portions are arranged side by side in a central portion of the holding member in the one direction.

In the present aspect, a plurality of the gripping portions are arranged side by side only at the center in the direction in which the multiple fuse terminals are arranged side by side. Accordingly, even if the gripping portion is not provided in a wide range, the worker can effectively perform gripping. Accordingly, it is possible to achieve a lighter weight of the electrical connection box.

The present disclosure will be described specifically with reference to the drawings indicating the embodiment. The electrical connection box according to the embodiment of the present disclosure will be described hereinafter with reference to the drawings. Note that the present disclosure is not limited to these illustrative examples, but is defined by the claims. Meanings equivalent to the claims and all modifications within the claims are intended to be included.

Embodiment 1

Figure 2:
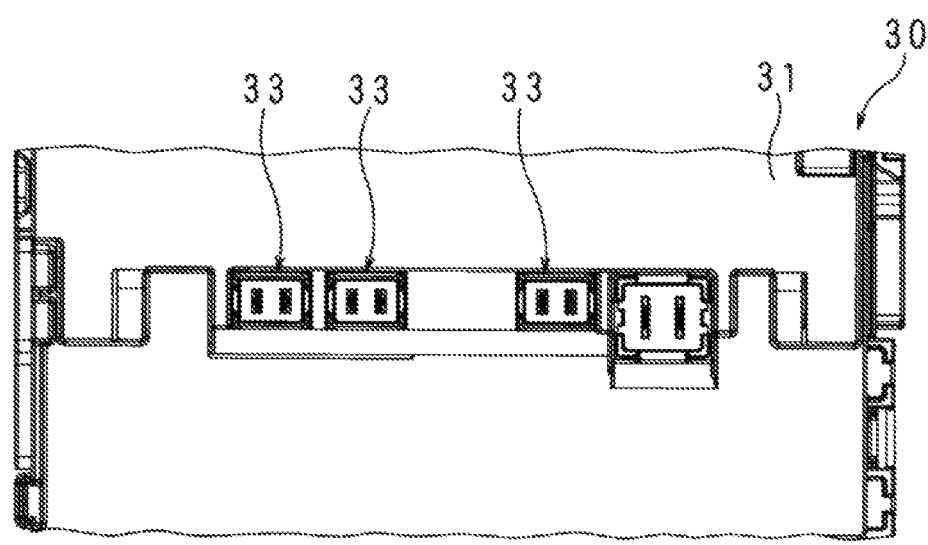
FIG. 2 is an enlarged view of a portion surrounded by a broken line in FIG. 1.

FIG. 1 is a perspective view showing the appearance of an electrical connection box 100 according to the present embodiment, and FIG. 2 is an enlarged view of a portion surrounded by a broken line in FIG. 1.

The electrical connection box 100 is a so-called fuse box into which fuses are inserted, and is mounted in a vehicle.

The electrical connection box 100 includes: a case member 30 that stores a substrate on which electrical components or the like are mounted; a fuse module 1 into which fuses are inserted; and a lid member 40 that covers an open port of the fuse module 1.

In the present embodiment, for the sake of convenience, "front", "rear", "left", "right", "up", and "down" of the electrical connection box 100 are defined according to the front-rear, left-right, and up-down directions shown in FIGS. 1 and 2. Hereinafter, description will be given using the thus-defined front-rear, left-right, and up-down directions.

The case member 30 includes: an upper case portion 31 and a lower case portion 32, and the front-side end portion of the upper case portion 31 covers the fuse module 1. The upper case portion 31 has a level difference, and the dimension of the front-side end portion is greater than that of the other portion in the up-down direction. In the upper case portion 31, multiple insertion ports 33 into which first fuses (not shown) are to be inserted are formed in the other portion excluding the front-side end portion. The first fuses are connected to the substrate via later-described FL terminals 14 (see FIG. 4). Also, the electrical connection box 100 is provided with multiple connector terminals 60 on the left and right side surfaces.

Figure 3:
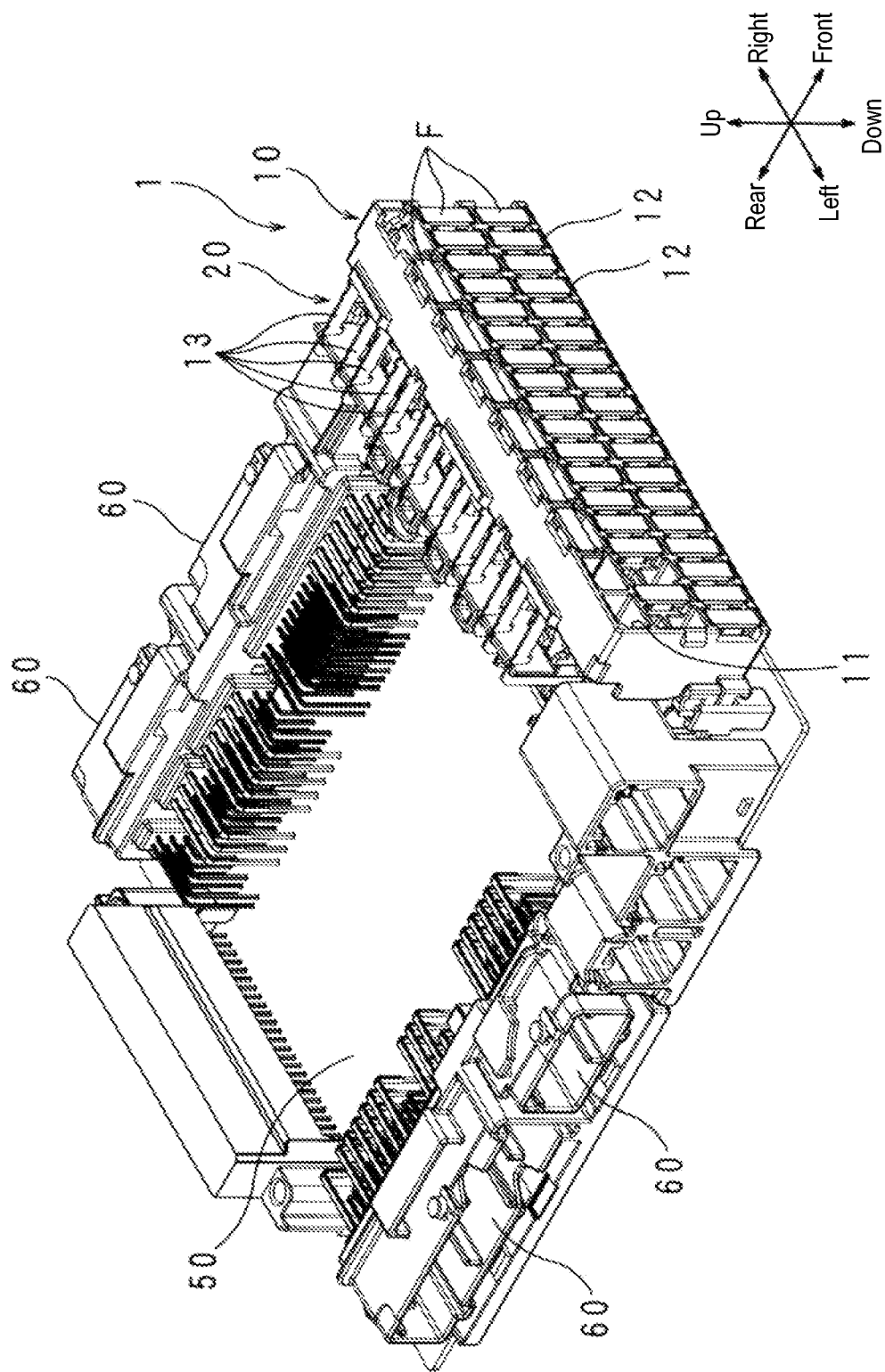
FIG. 3 is a perspective view showing a state in which a case member and a lid member have been omitted in the electrical connection box according to the present embodiment.

FIG. 3 is a perspective view showing the electrical connection box 100 according to the present embodiment, with the case member 30 and the lid member 40 omitted.

The fuse module 1 includes: an insertion housing 10 into which multiple second fuses F are inserted; multiple fuse terminals 13 that connect the second fuses F inserted into the insertion housing 10 and the substrate; and a holding member 20 that is a structural member for holding the fuse terminals 13.

The first fuses and the second fuses F are different types of fuses. For example, the first fuses and the second fuses F have different allowed currents, and differ in the amount of time it takes to melt and cut off the circuit.

The insertion housing 10 has a cuboid box shape in which the entire surface on the front side is open. Rectangular insertion holes 12 into which the second fuses F are inserted are provided in the form of a matrix inside of the insertion housing 10. That is, the insertion holes 12 are exposed via an open port 11 on the front side of the insertion housing 10.

The substrate 50 is arranged below the insertion housing 10. The substrate 50 is arranged spaced apart from the lower surface of the insertion housing 10, parallel to the lower surface. The second fuses F inserted into the insertion holes 12 are connected to the substrate 50 by the fuse terminals 13.

The open port 11 is rectangular, the multiple insertion holes 12 are arranged side by side in the lengthwise direction (left-right direction) of the open port 11 to form a row, and for example, three rows of insertion holes 12 are formed in the short direction (up-down direction) of the open port 11.

In the uppermost row that is farthest from the substrate 50, the lengthwise directions of the insertion holes 12 match the lengthwise direction of the open port 11, and in the other rows, the lengthwise directions of the insertion holes 12 intersect the lengthwise direction of the open port 11. That is, in the other rows, the lengthwise directions of the insertion holes 12 match the shorter direction of the open port 11.

Figure 4:
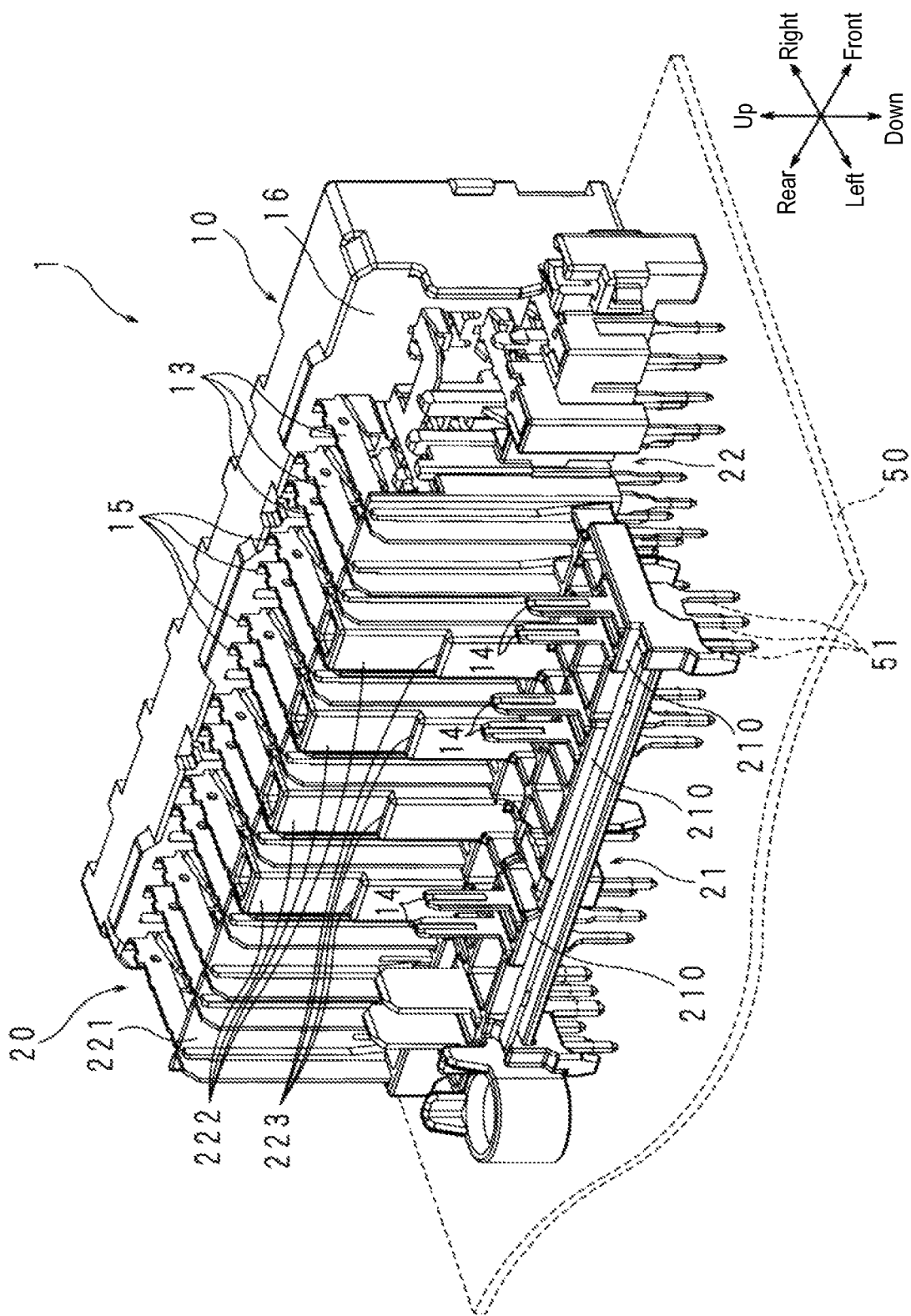
FIG. 4 is a perspective view showing a rear side of a fuse module of the electrical connection box according to the present embodiment.

FIG. 4 is a perspective view showing the rear side of the fuse module 1 of the electrical connection box 100 according to the present embodiment. In FIG. 4, for the sake of convenience in the description, the substrate 50 is indicated by a broken line.

Multiple through holes 15 into which the fuse terminals 13 are to be inserted are formed in the rear surface 16 of the insertion housing 10. For example, two through holes 15 are formed per insertion hole 12 (second fuse F).

The fuse terminals 13 are composed of thin plate materials made of a conductive metal. The fuse terminals 13 have bent portions at intermediate locations, and for example, are L-shaped. The end portions on one side of the fuse terminals 13 are inserted into the through holes 15 of the rear surface 16, and are connected to the second fuses F inserted into the insertion housing 10. The end portions on the other side of the fuse terminals 13 are bent downward, that is, toward the substrate 50, are inserted into through holes 51 of the substrate 50 (see FIG. 6), and are connected to the substrate 50 through soldering, for example.

The fuse terminals 13 inserted into the insertion holes 12 in the uppermost row (hereinafter referred to as the fuse terminals 13 in the uppermost row) are provided such that both main surfaces, which have large surface areas, face leftward or rightward. In other words, in each fuse terminal 13 of the uppermost row, the thickness direction of a portion on one side with respect to the bent portion and the thickness direction of a portion on another side with respect to the bent portion are parallel.

On the other hand, the fuse terminals 13 inserted into the insertion holes 12 of the other rows excluding the uppermost level (hereinafter referred to as the fuse terminals 13 of the other rows) are provided such that the side surfaces adjacent to the main surface face leftward or rightward. In other words, in each fuse terminal 13 of the other rows, the thickness direction of the portion on one side with respect to the bent portion and the thickness direction of the portion on the other side with respect to the bent portion intersect each other.

Note that the fuse terminals 13 of the uppermost rows are arranged leftward of and above the fuse terminals 13 of the other rows. The rear surface 16 of the insertion housing 10 is rectangular and the fuse terminals 13 of the uppermost row are arranged side by side in the lengthwise direction of the rear surface 16, that is, in the left-right direction (one direction).

The holding member 20 is composed of insulating plastic or the like and is arranged opposing the rear surface 16 of the insertion housing 10. The holding member 20 includes: a front portion 22 located toward the insertion housing 10; and a rear portion 21 located rearward with respect to the front portion 22.

The front portion 22 is a frame member having multiple holes formed in the up-down and left-right directions. Also, the front portion 22 includes a holding plate 221 for holding the fuse terminals 13 of the uppermost row. The holding plate 221 is provided with multiple notches in its upper edge portion, and the fuse terminals 13 of the uppermost row are held due to the notches engaging with the fuse terminals 13 of the uppermost row.

The rear surface of the holding plate 221 is provided with gripping portions 222 that are used for gripping the fuse module 1. The gripping portions 222 are provided between the fuse terminals 13 of the uppermost row and have quadrangular tube shapes. The gripping portions 222 extend in a direction intersecting the substrate 50, that is, in the up-down direction. The gripping portions 222 are provided at, for example, four locations in the center of the holding member 20 in the direction in which the fuse terminals 13 of the uppermost row are arranged side by side, that is, in the lengthwise direction of the rear surface 16 of the insertion housing 10. The four gripping portions 222 are arranged side by side in the direction in which the fuse members 13 of the uppermost row are arranged side by side.

The present embodiment is not limited thereto, and the gripping portions 222 may also be provided at three or fewer locations, or at five or more locations.

Thus, the electrical connection box 100 according to the present embodiment is provided with the gripping portions 222 only at the center in the lengthwise direction (left-right direction) of the fuse module 1. Accordingly, even if the gripping portions 222 are not provided in a wide range, a worker can efficiently grip the fuse module 1 during assembly work for the electrical connection box 100.

The gripping portions 222 are provided only at the center, and the gripping portions 222 are tube-shaped. Accordingly, it is possible to achieve a lighter weight of the electrical connection box 100 according to the present embodiment.

In the electrical connection box 100 according to the present embodiment, the gripping portions 222 are interposed between the fuse terminals 13 of the uppermost row. The gripping portions 222 protrude rearward with respect to the fuse terminals 13 of the uppermost row in the direction in which the insertion housing 10 and the holding member 20 oppose each other, that is, in the front-rear direction.

Accordingly, in the electrical connection box 100 according to the present embodiment, it is possible to prevent a worker from mistakenly touching the fuse terminals 13 in the uppermost row and other electrical components when the worker grips the fuse module 1. Accordingly, it is possible to prevent the occurrence of an inconvenience such as the fuse terminals 13 in the uppermost row and the other electrical components deforming or being contaminated due to coming into contact with a worker's hand.

The rear portion 21 on the rear side with respect to the front portion is a grid-shaped frame member. The rear portion 21 includes multiple inner-fitting holding portions 210 that hold the FL terminals 14 (other terminals) for connecting the first fuses and the substrate 50. The multiple inner-fitting holding portions 210 are configured such that two slits 211 form a pair. The inner-fitting holding portions 210 hold the FL terminals 14 such that the FL terminals 14 extend in a direction intersecting the substrate 50, that is, in the lengthwise direction of the gripping portions 222.

Figure 5:
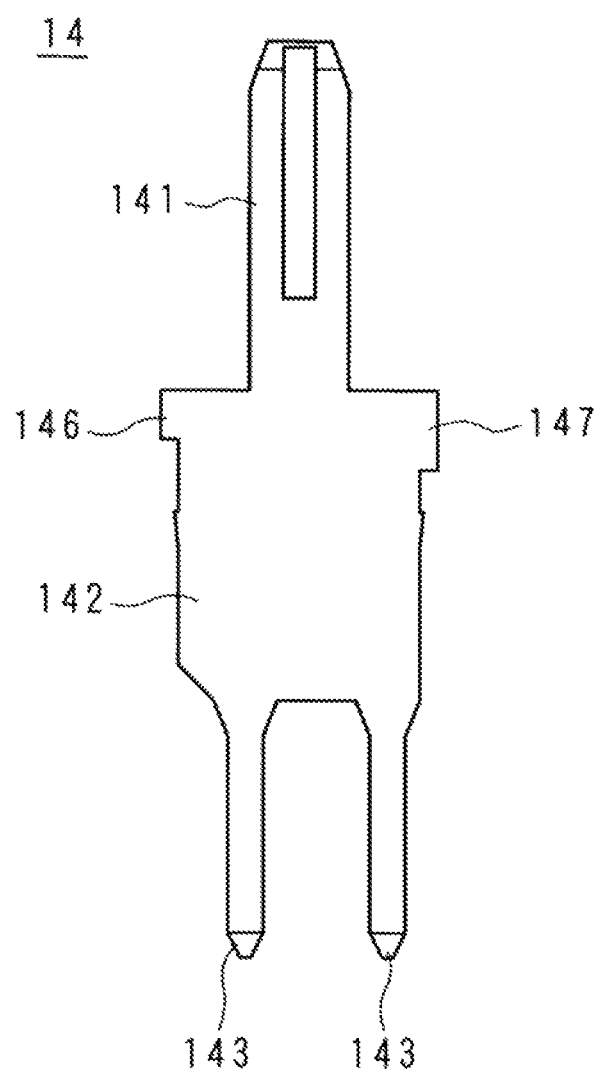
FIG. 5 is a front view of an FL terminal of the electrical connection box according to the present embodiment.

FIG. 5 is a front view of an FL terminal 14 of the electrical connection box 100 according to the present embodiment. The FL terminal 14 is composed of a thin plate material made of a conductive metal. The FL terminal 14 includes: a plate portion 141 that is inserted into a first fuse; an inner-fitting plate portion 142 that is fit into and held in an inner-fitting holding portion 210 of the rear portion 21; and substrate connection portions 143 that are to be connected to the substrate 50.

The inner-fitting plate portion 142 has an approximately rectangular plate shape. For example, the plate portion 141 is extended in a direction along the surface of the inner-fitting plate portion 142 from an edge on one end side (upper side) in the lengthwise direction of the inner-fitting plate portion 142, and the substrate connection portions 143 are extended in a direction along the surface of the inner-fitting plate portion 142 from an edge on the other end side (lower side). The plate portion 141 is strip-shaped, and is provided at the approximate center of the edge on the one end side of the inner-fitting plate portion 142.

On both edges adjacent to the edge on the one end side, the inner-fitting plate portion 142 is provided with mutually different protruding portions 146 and 147 at end portions toward the edge on the one end side. That is, on the one end side of the two edges in the shorter direction of the inner-fitting plate portion 142, the protruding portions 146 and 147 are provided extending along the surface of the inner-fitting plate portion 142. The protruding portions 146 and 147 have mutually different dimensions in the direction in which the edge on the one end side and the edge on the other end side of the inner-fitting plate portion 142 oppose each other, that is, in the lengthwise direction of the inner-fitting plate portion 142.

The substrate connection portions 143 are pin-shaped, and two substrate connection portions 143 protrude from the edge on the other end side of the inner-fitting plate portion 142. That is, two substrate connection portions 143 are arranged side by side along the edge on the other end side.

Thus, the FL terminal 14 is configured to have a shape that is asymmetrical in the direction in which the two substrate connection portions 143 are arranged side by side.

On the other hand, in the electrical connection box 100 according to the present embodiment, finger placement portions 223 are formed on the rear-side outer surfaces of the gripping portions 222. Specifically, on the rear-side outer surfaces of the gripping portions 222, level differences in which the dimension of the gripping portion 222 increases in the direction (front-rear direction) in which the insertion housing 10 and the holding member 20 face each other are provided at an intermediate portion in the vertical direction, that is, the up-down direction of the gripping portions 222. The level differences serve as the finger placement portions 223.

Figure 6:
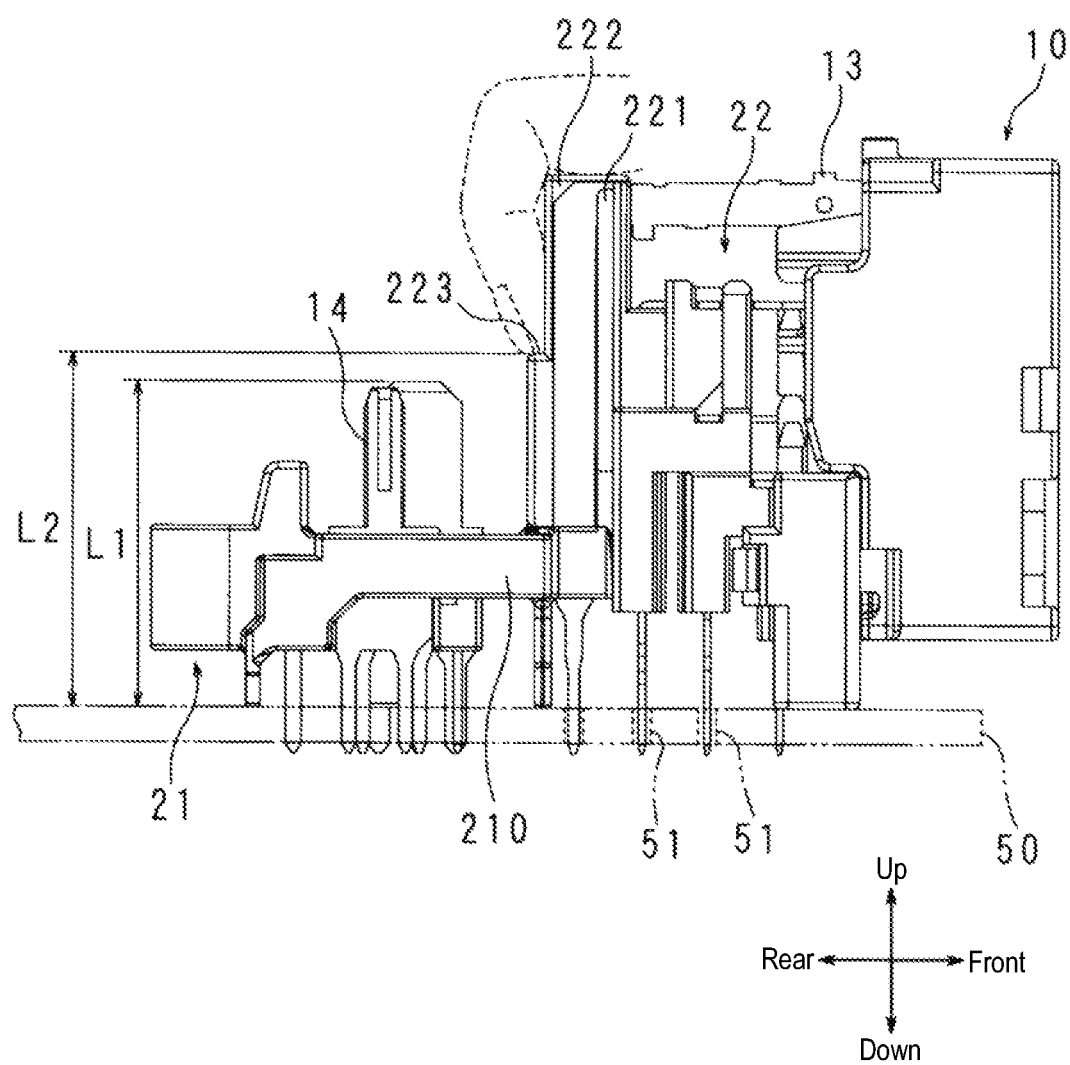
FIG. 6 is a schematic illustrative diagram showing a state in which a fuse module is gripped by a worker using a gripping portion in the electrical connection box according to the present embodiment.

FIG. 6 is a schematic illustrative diagram showing a state in which a worker grips the fuse module 1 using the gripping portions 222 in the electrical connection box 100 according to the present embodiment. FIG. 6 shows a side surface of the fuse module 1, and for convenience in the description, the substrate 50 is indicated by a two-dot chain line.

In the direction intersecting the substrate 50 (the up-down direction), the dimension L2 from the substrate 50 to the finger placement portions 223 (level differences) is greater than the dimension L1 from the substrate 50 to the leading ends of the FL terminals 14 (upper end of the plate portion 141). That is, the finger placement portions 223 are formed above the leading ends of the FL terminals 14.

Due to having this kind of configuration, a worker can intuitively understand the gripping positions of the gripping portions 222, and thus it is possible to prevent the worker from mistakenly touching the FL terminals 14 when gripping the fuse module 1.

That is, when a worker assembling the electrical connection box 100 according to the present embodiment grips the fuse module 1, the worker feels for the finger placement portions 223 with fingertips from the upper sides to the lower sides of gripping portions 222. If the worker finds the finger placement portions 223, the worker uses them to grip the fuse module 1 (see the broken line in FIG. 6). Accordingly, the worker does not touch lower than the finger placement portions 223, that is, toward the FL terminal 14, with his or her fingertips. Accordingly, it is possible to prevent the FL terminals 14 from deforming or being contaminated due to being touched by the worker's hand.

Embodiment 2

Figure 7:
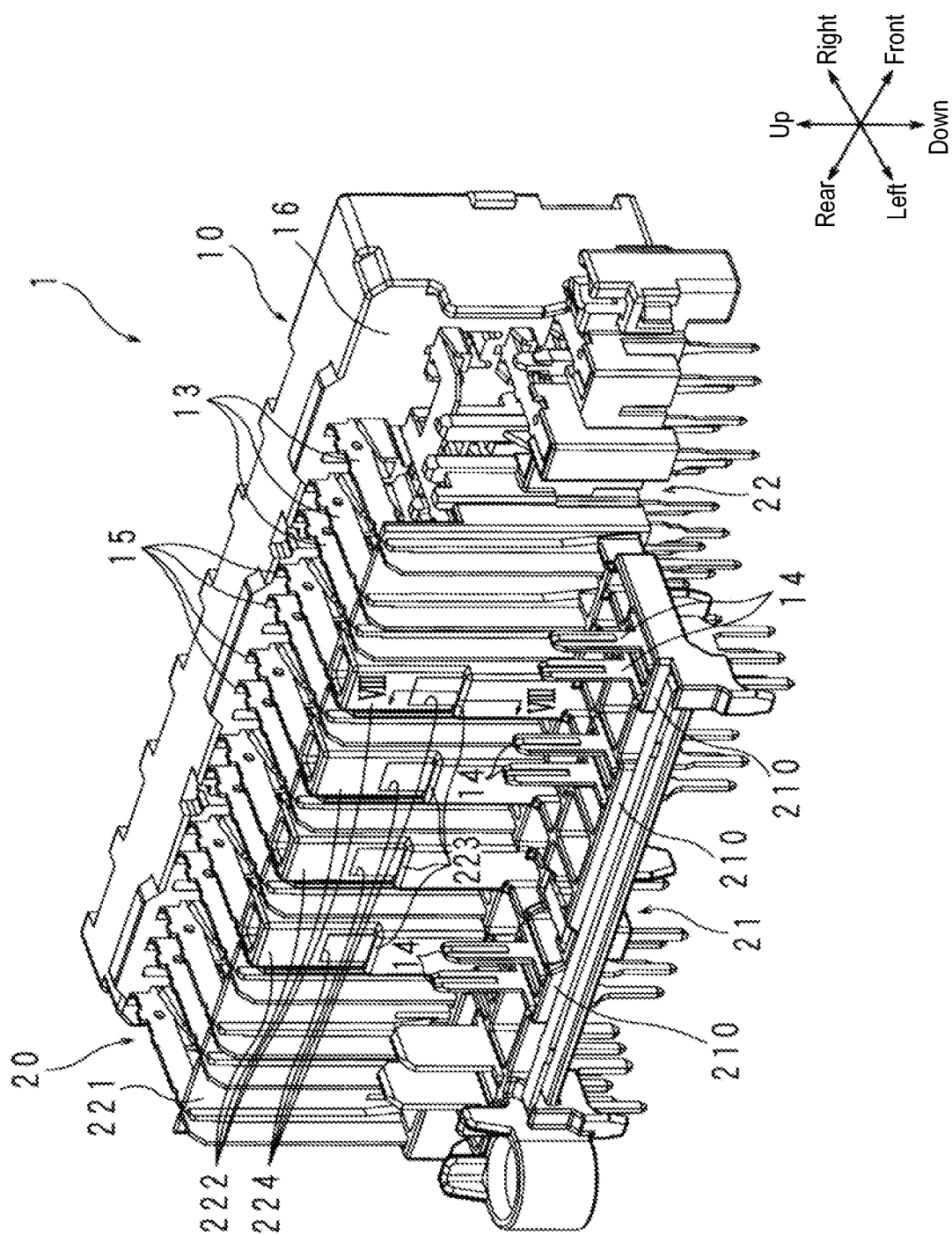
FIG. 7 is a perspective view showing a rear side of the fuse module of the electrical connection box according to the present embodiment.

FIG. 7 is a perspective view showing the rear side of the fuse module 1 of the electrical connection box 100 according to the present embodiment.

Similarly to Embodiment 1, the electrical connection box 100 according to the present embodiment also includes quadrangular tube-shaped gripping portions 222. Furthermore, in the electrical connection box 100 of the present embodiment, notches 224 are formed on the rear-side outer surfaces of the gripping portions 222. The notches 224 are formed near the finger placement portions 223.

The notches 224 are rectangular, for example. As described above, since the gripping portions 222 are tube-shaped, the notches 224 penetrate through the gripping portions 222. The electrical connection box 100 according to the present embodiment is not limited to this, and for example, the notches 224 may also be circular, inverted triangle-shaped, or the like.

By using this kind of configuration, when the electrical connection box 100 according to the present embodiment is being assembled, the worker hooks his or her fingertips into the notches 224 and squeezes the gripping portions 222 (fuse module 1) to grip the fuse module 1. Accordingly, the worker can reliably confirm the gripping portions 222 (finger placement portions 223). Also, since the worker's fingertips hook onto the edges of the notches 224, the worker can more reliably and efficiently grip the fuse module 1.

Portions similar to those of Embodiment 1 are denoted by the same reference numerals thereas, and detailed description thereof is omitted.

Embodiment 3

Figure 8:
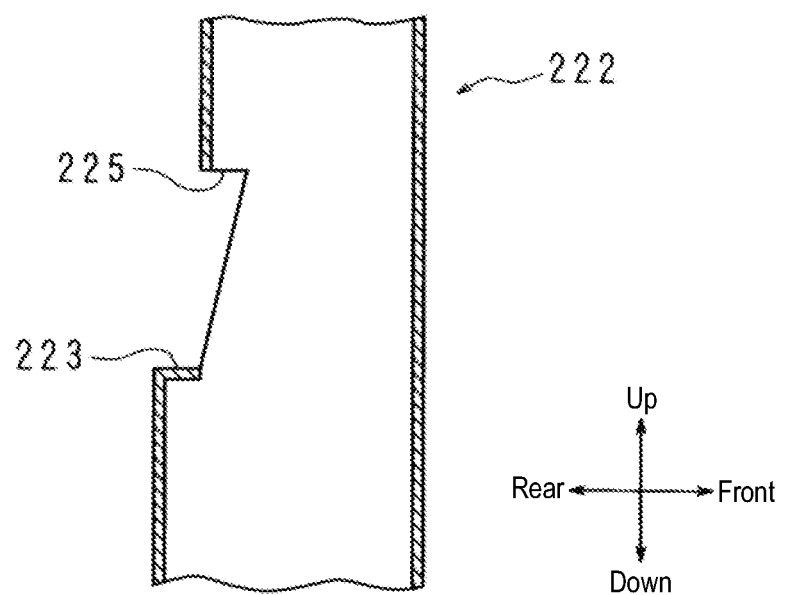
FIG. 8 is a schematic cross-sectional view of the gripping portion of the electrical connection box according to the present embodiment.

FIG. 8 is a schematic cross-sectional view of a gripping portion 222 of the electrical connection box 100 according to the present embodiment. FIG. 8 is a cross-sectional view of a portion corresponding to the VIII-VIII line in FIG. 7 in the electrical connection box 100 according to Embodiment 3.

Similarly to Embodiments 1 and 2, the electrical connection box 100 according to the present embodiment also includes quadrangular tube-shaped gripping portions 222. Also, similarly to Embodiment 2, in the electrical connection box 100 according to the present embodiment, notches 225 are formed on the rear-side outer surfaces of the gripping portions 222. However, the shape of the notches 225 of the electrical connection box 100 according to the present embodiment is different from the shape of the notches 224 of Embodiment 2.

The notches 225 are formed not only on the rear-side outer surfaces of the gripping portions 222, but also over both outer surfaces adjacent to the rear-side outer surfaces. The shape of the notches 225 on both outer surfaces is an inverted right triangle. That is, the gripping portions 222 of the electrical connection box 100 according to the present embodiment are provided such that the dimensions of the notches 225 in the front-rear direction increase in the upward direction on both outer surfaces (left-right outer surfaces) that are adjacent to the rear-side outer surfaces.

Due to having this kind of configuration, when the electrical connection box 100 according to the present embodiment is being assembled, the worker can grip the fuse module 1 by hooking his or her fingertips into the notches 225. Accordingly, the worker can reliably confirm the gripping portions 222, and the worker can more reliably and easily grip the fuse module 1.

Portions similar to those of Embodiments 1 and 2 are denoted by the same reference signs thereas, and detailed description thereof is omitted.

The embodiments disclosed herein are illustrative in all respects, and are not to be construed as limiting. The scope of the present disclosure is defined not by the above-described meaning, but by the claims, and meanings equivalent to the claims and all modifications within the claims are intended to be included.

What is claimed is:

1. An electrical connection box for a vehicle, including: an insertion housing into which a plurality of fuses are to be inserted; a plurality of fuse terminals for connecting the fuses in the insertion housing to a substrate; and a holding member that is arranged opposing a surface of the insertion housing and holds the fuse terminals, wherein
the holding member includes a holding plate having a plurality of notches for holding at least one of the plurality of fuse terminals and a gripping portion opposite of the insertion housing, the gripping portion being tube shaped and disposed between a pair of the plurality of fuse terminals, and
the gripping portion has a finger placement portion used for gripping.

2. The electrical connection box according to claim 1, wherein the finger placement portion is a level difference provided in the gripping portion.

3. The electrical connection box according to claim 2, wherein the gripping portion is provided with a notch.

4. The electrical connection box according to claim 1, wherein
the gripping portion is interposed between the fuse terminals, and
the gripping portion protrudes past the fuse terminals in the direction in which the insertion housing and the holding member oppose each other.

5. The electrical connection box according to claim 2, wherein
the substrate is provided parallel to a surface adjacent to the insertion housing,
the gripping portion extends in an intersection direction intersecting the substrate,
wherein one of the plurality of fuses protrudes in the intersection direction from the substrate and connects one of the plurality of fuses, the one of the plurality of fuses being different than the other of the plurality of fuses, and
a dimension from the substrate to the level difference of the gripping portion in the intersection direction is greater than a dimension from the substrate to a leading end of the other terminal.

6. The electrical connection box according to claim 1, wherein
the plurality of fuse terminals are arranged side by side in one direction, and
a plurality of the gripping portions are arranged side by side in a central portion of the holding member in the one direction.

7. The electrical connection box according to claim 2, wherein
the gripping portion is interposed between the fuse terminals, and
the gripping portion protrudes past the fuse terminals in the direction in which the insertion housing and the holding member oppose each other.

8. The electrical connection box according to claim 3, wherein the gripping portion is interposed between the fuse terminals, and
the gripping portion protrudes past the fuse terminals in the direction in which the insertion housing and the holding member oppose each other.

9. The electrical connection box according to claim 2, wherein
the plurality of fuse terminals are arranged side by side in one direction, and
a plurality of the gripping portions are arranged side by side in a central portion of the holding member in the one direction.

10. The electrical connection box according to claim 3, wherein
the plurality of fuse terminals are arranged side by side in one direction, and
a plurality of the gripping portions are arranged side by side in a central portion of the holding member in the one direction.

11. The electrical connection box according to claim 4, wherein
the plurality of fuse terminals are arranged side by side in one direction, and
a plurality of the gripping portions are arranged side by side in a central portion of the holding member in the one direction.

12. The electrical connection box according to claim 5, wherein
the plurality of fuse terminals are arranged side by side in one direction, and
a plurality of the gripping portions are arranged side by side in a central portion of the holding member in the one direction.

* * * * *